G. E. KIMMEL.
ATTACHMENT FOR VEHICLE WHEELS.
APPLICATION FILED APR. 13, 1909.

951,533.

Patented Mar. 8, 1910.

WITNESSES:

INVENTOR
G. E. Kimmel
BY
W. J. FitzGerald & Co.
Attorneys

UNITED STATES PATENT OFFICE.

GILFORD E. KIMMEL, OF RUTLAND, INDIANA.

ATTACHMENT FOR VEHICLE-WHEELS.

951,533.  Specification of Letters Patent.  Patented Mar. 8, 1910.

Application filed April 13, 1909. Serial No. 489,607.

*To all whom it may concern:*

Be it known that I, GILFORD E. KIMMEL, a citizen of the United States, residing at Rutland, in the county of Marshall and State of Indiana, have invented certain new and useful Improvements in Attachments for Vehicle-Wheels; and I do hereby declare the following to be a full, clear, and exact description of the invention, such as will enable others skilled in the art to which it appertains to make and use the same.

My invention relates to new and useful improvements in vehicle wheel attachments and my object is to provide an extra tire and supporting rim therefor and a further object is to provide means for attaching the extra tire and rim to any one of the wheels of the vehicle and a still further object is to provide means for securely locking the holding devices in position.

Other objects and advantages will be hereinafter referred to and more particularly pointed out in the claim.

Figure 1:
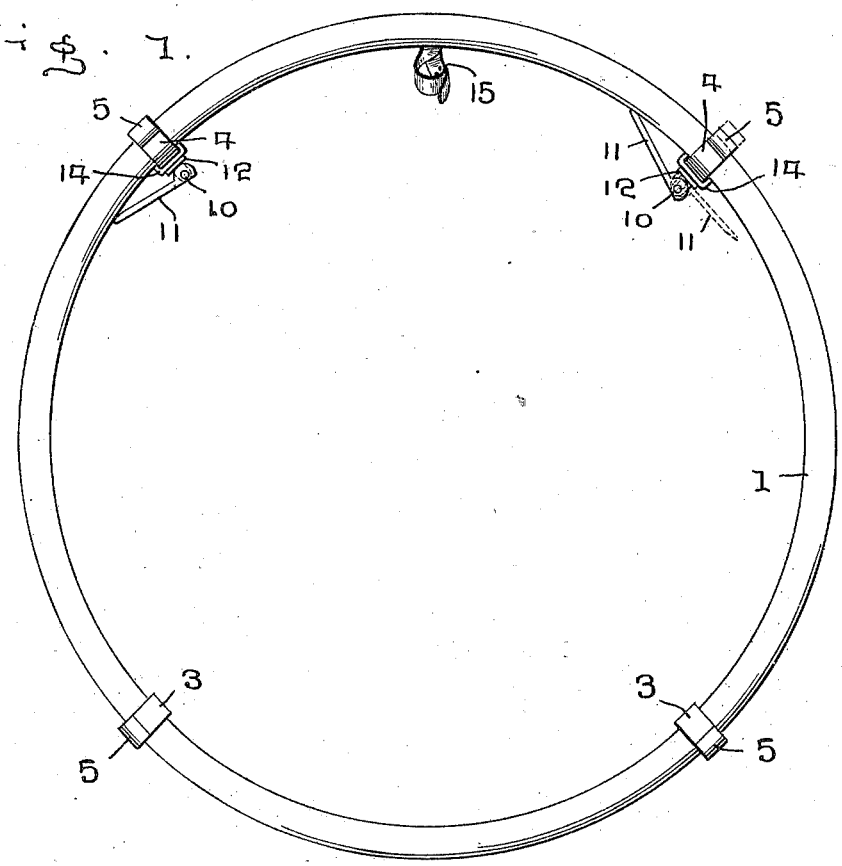
Figure 2:
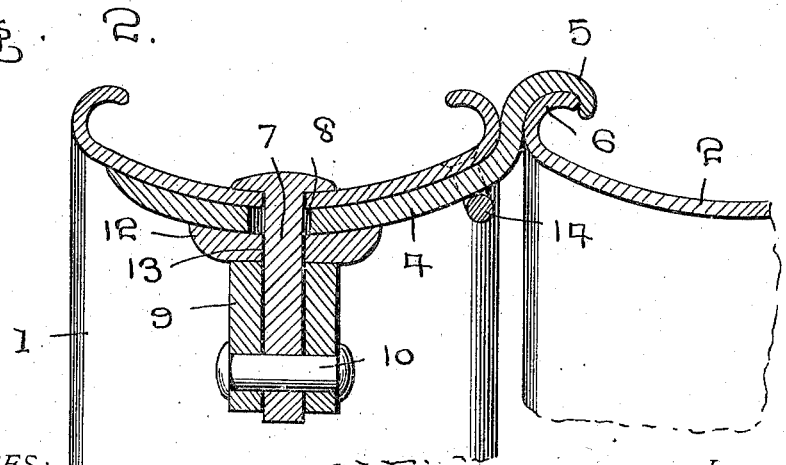

In the accompanying drawings forming part of this application, Figure 1 is an elevation of a wheel rim and means for attaching the same to the rim of the wheel on the vehicle, and, Fig. 2 is a transverse sectional view through the rim of the vehicle and the extra rim, the section being on an enlarged scale and through one of the fastening devices.

The main object of my invention is to overcome the objectionable feature of having to change the tire when traveling should the tire become punctured, and to this end, the usual form of tire (not shown), is attached to a rim 1, which may be of any preferred make and arranged to be attached to the rim 2 of the vehicle wheel and in order to quickly attach the extra rim and tire without removing the punctured tire, I provide on the rim 1, clamping arms 3 and 4, said arms being preferably arranged at the four quarters of the rim, the arms 3 being fixed to the rim, while the arms 4 are adjustably attached thereto.

One end of the arms 3 is extended beyond and conformed to the contour of the outer edge of the rim and terminates in a hook 5, which hook is adapted to extend over and engage the flange 6 of the rim 2, thereby securely locking the rim 1 to the rim 2.

The arms 4 are mounted upon bolts 7, which extend downwardly through the rim and through slots 8 in the arms 4, thereby giving the arms 4 a slight longitudinal movement, so that the hooks 5 may be readily extended over and into engagement with the flange 6, the arms 4 being securely clamped in engagement with the rim 1, after they have been engaged with the rim 2, by means of a cam 9, said cam being bifurcated to receive the bolt 7 and is pivotally attached to the lower end of the bolt by extending a rivet or the like 10 laterally through the bolt and the sections of the cam.

The cam is controlled by means of a lever 11 and the cam is so arranged that when the lever is in the position shown in full lines in Fig. 1, the arms 4 will be securely clamped against the rim 1, but when turned to the position shown by dotted lines in said figure, the arms will be free and in position to be readily removed from engagement with the rim 2.

When the lever 11 is swung to clamp the arms 4 in position, the face of the cam engages a clamping plate 12, which is provided with an opening 13 to receive the bolt 7 and the arms 4 are held against swinging movement by providing guide loops 14 adjacent the outer edge of the rim 1, through which the arms 4 are introduced. The cam 9 is also so arranged as to increase the pressure of the clamping plate and arm as the lever is swung to the position shown in full lines in Fig. 1 and in such position the pressure of the cam on the clamping plate and arm will hold the lever firmly.

In addition to employing the arms for attaching the extra rim to the rim of the wheel, any suitable form of strap 15 may be attached to the extra rim 1 and in position to be extended around one or more spokes of the wheel to which the extra rim is attached.

In applying the extra rims, the levers are first turned to the position shown by dotted lines in Fig. 1, when the hooks 5 of the arms 3 are engaged with the flanges of the rim 2 and the rim 1 then brought into alinement with the rim 2 and the hooks of the arms 4 engaged with the rim when the levers 11 are to be swung to the position shown in full lines in Fig. 1 and all of said arms securely locked in engagement with the rim 2. The strap 15 may be then attached to the spokes of the wheel to more securely retain the extra rim in position and should, for any reason, one of the levers become loosened, said strap will retain the extra rim in position until such time as the vehicle can be stopped and the loosened lever again adjusted. In this manner it will be readily seen that the extra rim and tire may be very quickly applied to use and obviate the usual laborious task of removing the old tire and introducing the new one in its place and it will further be seen that as the extra rim is securely locked in position, the travel of the vehicle will be the same as when the regular tire on the wheel is in proper condition and being used.

What I claim is:

In an attachment for vehicle wheels, the combination with a rim of the wheel, of a similarly constructed rim, arms applied to said first referred to rim and having laterally extending recurved portions adapted to receive laterally the second referred to rim, said arms having slots therein extending in the direction of the longitudinal plane thereof, said first referred to rim also having guide loops receiving said arms, a bifurcated cam, a bolt having its stem passing through said cam, means for effecting connection between said bolt and said cam, said cam having a lever-member for its manual actuation, and a clamping plate through which said bolt passes, engaged by said cam and itself engaging said arm.

In testimony whereof I have signed my name to this specification in the presence of two subscribing witnesses.

GILFORD E. KIMMEL.

Witnesses:
L. M. LAUER,
IMOJEAN KYSER.